Feb. 16, 1971 P. M. EBERT 3,564,414

DIGITAL DATA RATE CONVERTER USING STUFFED PULSES

Filed March 28, 1969 5 Sheets-Sheet 1

INVENTOR
P. M. EBERT
BY J. P. Kearns
ATTORNEY

DIGITAL DATA RATE CONVERTER USING STUFFED PULSES

Filed March 28, 1969 5 Sheets-Sheet 2

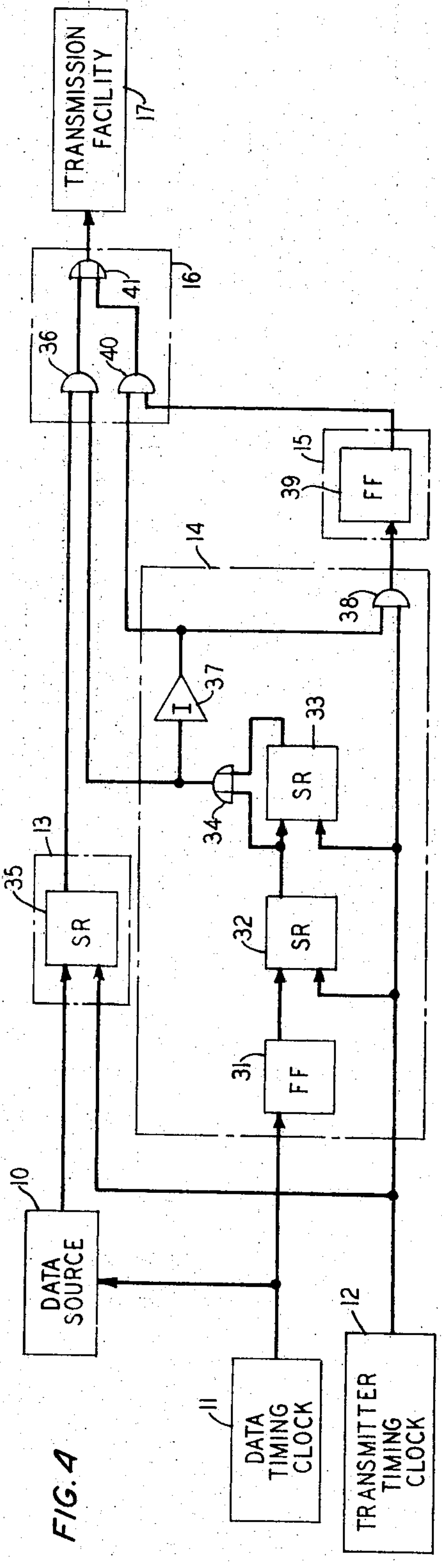
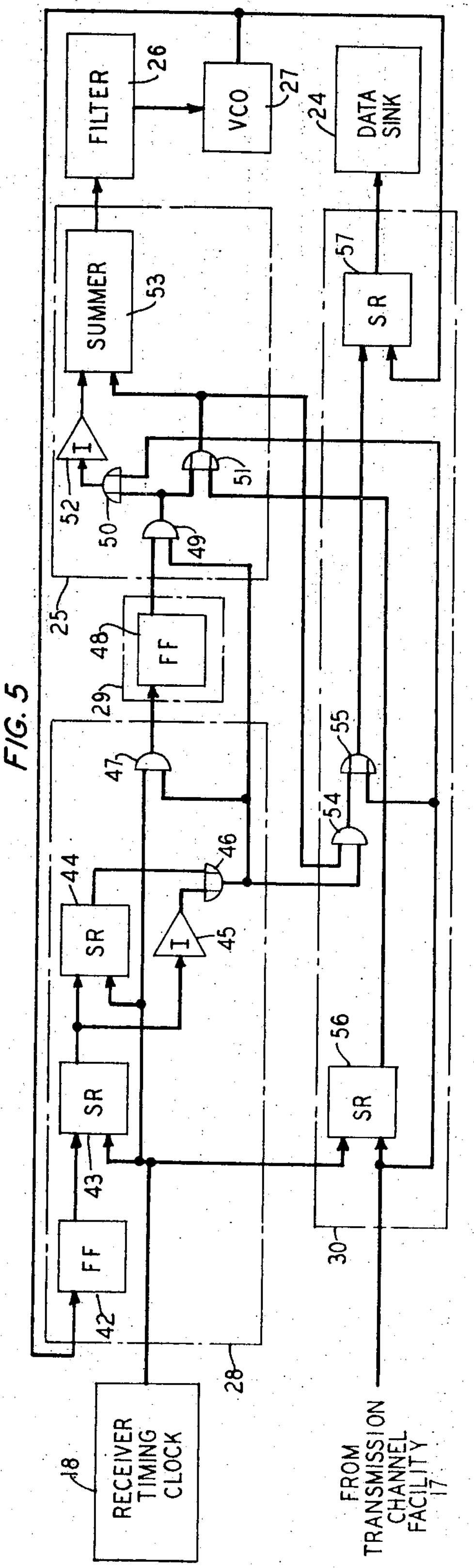
FIG. 5

Feb. 16, 1971 P. M. EBERT 3,564,414

DIGITAL DATA RATE CONVERTER USING STUFFED PULSES

Filed March 28, 1969 5 Sheets-Sheet 4

United States Patent Office 3,564,414
Patented Feb. 16, 1971

3,564,414
DIGITAL DATA RATE CONVERTER USING STUFFED PULSES

Paul M. Ebert, Fair Haven, N.J., assignor to Bell Telephone Laboratories, Incorporated, Murray Hill, N.J.

Filed Mar. 28, 1969, Ser. No. 811,362
Int. Cl. H04b *1/00*
U.S. Cl. 325—38 12 Claims

ABSTRACT OF THE DISCLOSURE

A digital data transmission system designed to operate at one rate is adapted to transmit data at another rate without altering the transmission facility, provided the data source rate is lower than the transmission rate. The arrangement is such that data bits are sampled once only. Where multiple samples would otherwise have occurred, a predetermined pulse sequence is interleaved with the data samples to maintain synchronism.

FIELD OF THE INVENTION

This invention relates to digital data transmission systems and particularly to data rate converters for such systems.

BACKGROUND OF THE INVENTION

The rate that is ideal for a given transmission facility is not necessarily ideal for all or many data sources. Thus, the ideal rate for a transmission facility must necessarily be a compromise with respect to any data source supplying information to such a facility. Complex buffering arrangements have been used in systems where the data source does not operate at the transmission rate. However, the invention described herein allows for the simple coupling of the data source to the transmission facility without the need for such a buffer.

In the copending application Ser. No. 667,768, filed on Sept. 14, 1967 by B. R. Saltzberg and J. E. Savage, there is described a data rate converter which does not make use of pulse-stuffing techniques and wherein a requirement is made that the ratio between the data source rate and the transmission rate be a rational number less than one. In contrast, the invention described herein makes use of pulse-stuffing techniques and the only requirement made is that the data source rate be lower than the transmission rate.

It is an object of this invention to match a data source operating at its ideal rate to a transmission facility operating at its ideal rate without altering either the data source or the transmission facility.

It is another object of this invention to enable the coupling of a transmission facility and a data source without modifying the natural synchronous rate of either.

It is a further object of this invention to provide a simple device for matching a synchronous digital data source to a synchronous transmission facility when the latter operates at a greater rate than the former.

SUMMARY OF THE INVENTION

The purpose of this data rate converter is to match a data source rate to a higher transmission rate using pulse-stuffing techniques. At the transmitter the pulse stuffing is done in such a way that at the receiver the stuffed pulses can easily be separated from the data pulses, and the original data restored.

Given a transmission rate and a data source rate, where the transmission rate is greater than the data source rate, there exists a third signal called the stuffed-pulse timing signal, whose rate is the difference between the transmission rate and the data source rate, such that the transmission timing pulses interleave the union of the data timing pulses and the stuffed-pulse timing pulses. Thus, the transmitter transmits a data source pulse when the transmission timing pulse follows a data timing pulse and transmits a stuffed pulse when the transmission timing pulse follows a stuffed source timing pulse.

According to this invention, the data source pulses are sampled at the transmission rate and some of these data samples, together with interleaved stuffed pulses, are sent over the transmission facility at the transmission rate. Since the data rate is lower than the transmission rate some data source pulses will be sampled more than once. Redundant data samples are suppressed at the transmitter and the stuffed-pulse sequence replaces them. Proper phasing of the sampling times at the receiver will effectively skip these transmitted stuffed pulses and pass along only the regenerated nonredundant data pulses at the original data source rate. The stuffed-pulse sequence chosen can be a sequence of alternating zeros and ones; however, if this particular sequence is not desirable then any sequence known to both the transmitter and receiver can be used.

Knowing the transmission rate and the data rate, the number of redundant samples obtainable at the transmission rate can be predetermined. The nominal rate at which these redundant data samples appear is the difference between the transmission rate and the data rate. At the receiver, however, either the stuffed-pulse sequence or the nonredundant data samples can be recovered with a phase-locked loop. This is so since the phase-locked loop can operate at either the stuffed-pulse rate or the data rate. Thus, it is possible to sample the line signal either at the data rate for the nonredundant data pulses or at the stuffed pulse rate for the stuffed pulses; whichever approach is used is a matter of design convenience.

It is a feature of this invention that the data rate converter can readily be adapted to accommodate any data source rate as long as it is lower than the transmission rate.

DESCRIPTION OF THE DRAWING

The above and other objects, features, and advantages of this invention will be better appreciated by a consideration of the following detailed description and the drawing in which:

FIG. 4 is a block diagram of a transmitter according to this invention wherein the stuffed-pulse sequence is an alternating sequence of zeros and ones;

FIG. 5 is a block diagram of a receiver according to this invention wherein the phase-locked loop operates at the data source rate.

DETAILED DESCRIPTION

Figure 1:
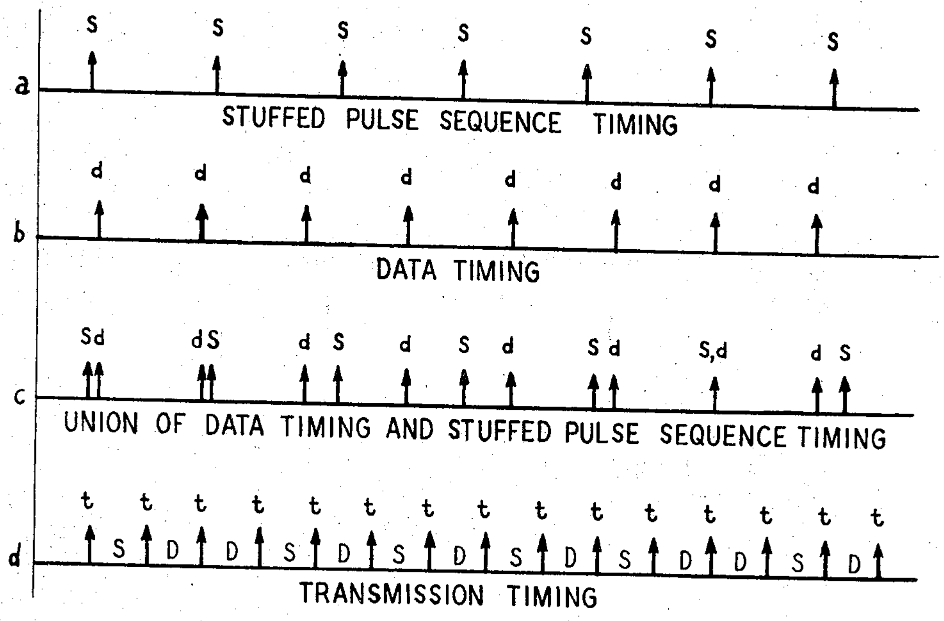
FIG. 1 illustrates the interleaving principle.

FIG. 1 illustrates the interleaving principle which is stated as follows: given a transmission rate $f_1$ and a data source rate $f_2$, where $f_1$ is greater than $f_2$, a third timing signal $f_3$, whose rate is the difference of $f_1$ and $f_2$, exists such that the timing pulses of the transmission rate $f_1$ interleave the union of the timing pulses of $f_2$ and $f_3$. Line $d$ of FIG. 1 illustrates the transmission timing pulses $t$ at the rate $f_1$ and line $b$ of FIG. 1 illustrates the data timing pulses $d$ at the rate $f_2$. The timing pulses $s$ of the third timing signal, the stuffed-pulse rate, are illustrated on line $a$ of FIG. 1. The relative phase between the data timing signal and the transmission timing signal is arbitrary. The union of the data timing pulses $d$ and the stuffed timing pulses $s$ is shown on line $c$ of FIG. 1. By comparing lines $c$ and $d$ of FIG. 1 it is seen that the transmission timing pulses $t$ interleave the union of the data $d$ and stuffed timing $s$ pulses; that is, one and only one transmission timing pulse $t$ of line $d$ of FIG. 1 falls between any two adjacent timing pulses $s$ or $d$ of line $c$ of FIG. 1. Thus, if a transmission timing pulse $t$ follows a stuffed timing pulse $s$, then a stuffed pulse S is sampled and transmitted. If a transmission timing pulse $t$ follows a data timing pulse $d$ then a data pulse D is sampled and transmitted. The line signal will thus consist of nonredundant data samples D together with the stuffed-pulse sequence S in place of the redundant data samples. The stuffed-pulse sequence can be any sequence known to both the transmitter and receiver.

Figure 2:
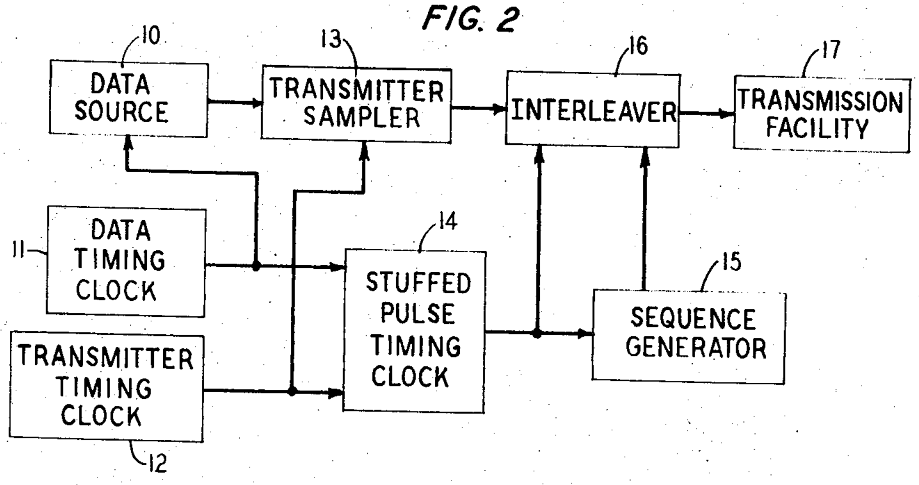
FIG. 2 is a block diagram of the transmitter end of a synchronous digital data transmission system modified according to this invention.
Figure 3A:
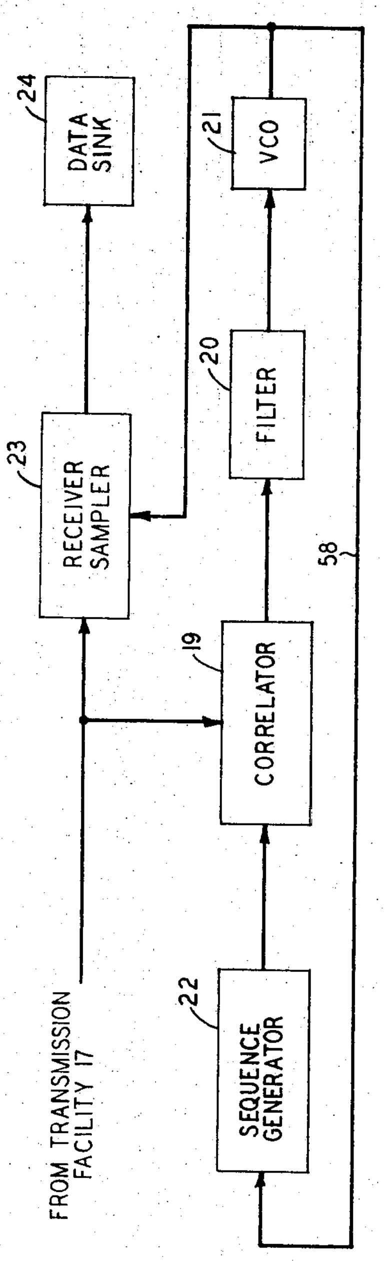
FIGS. 3A and 3B are block diagrams of the receiver end of a synchronous digital data transmission system modified according to this invention wherein the receiver phase-locked loop operates at the stuffed-pulse and data source rates, respectively.
Figure 3B:
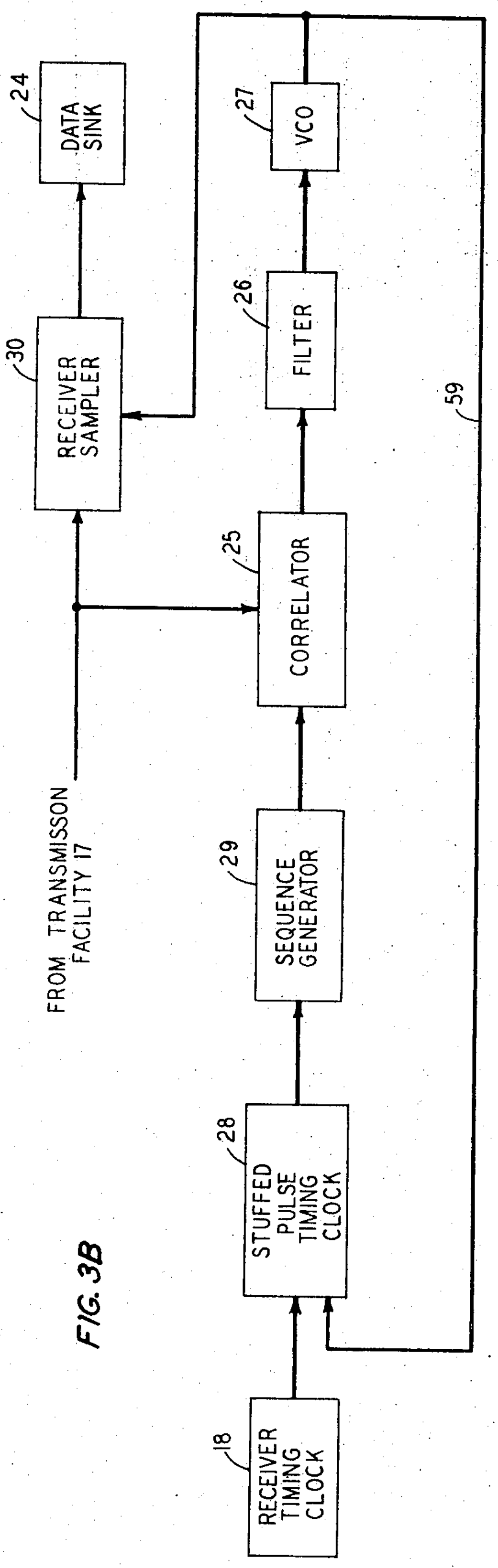

FIG. 2 illustrates the transmitter end of a synchronous digital data transmission system modified according to this invention. FIGS. 3A and 3B illustrate the receiver end of a synchronous digital data transmission system modified according to this invention wherein the receiver phase-locked loop operates at the stuffed-pulse and data source rates, respectively. The transmitter of FIG. 2 is linked to the receiver of either FIG. 3A or FIG. 3B by a transmission facility 17.

The data communications transmitter comprises digital data source 10, data timing clock 11, and transmitter timing clock 12. The data communications receiver of either of FIGS. 3A or 3B fundamentally comprises sampler 23 or 30 and data sink 24. The transmission facility 17 constitutes a transmission link between the transmitter and receiver and may be a wire line, a cable, or a channel of a multiplex system, itself including possible radio links. Depending on the bandwidth of transmission facility 17 and other factors such as noise, an ideal synchronous transmission rate is established. Transmission facility 17 is generally furnished by a communications utility while data source 10, data timing clock 11, and data sink 24 are provided by a data communications customer. It is desired to modify the transmission system so that data source 10 and data sink 24 can operate at some lesser synchronous rate $f_2$ substantially independently of transmission rate $f_1$. Thus, the communications customer can have some control over his source and sink rate and still continue to use the utility-provided communications network.

The necessary modification at the transmitter and of transmission facility 17 comprises transmitter sampler 13, stuffed-pulse timing clock 14, sequence generator 15, and interleaver 16.

Transmitter timing clock 12 provides synchronous timing signals at the rate $f_1$ to stuffed-pulse timing clock 14 and to transmitter sampler 13. Stuffed-pulse timing clock 14 also receives timing signals at the rate $f_2$ from data source clock 11 as does data source 10. Clock 14, by correlating data rate $f_2$ and transmission rate $f_1$, determines whether or not a particular data source pulse is being sampled two or more times at sampler 13. Thus clock 14 monitors the two timing signals. At the same time clock 14 activates sequence generator 15 at the rate $f_3$ to produce the stuffed sequence. At interleaver 16 the nonredundant data samples from sampler 13 are passed through to transmission facility 17 to form part of the line signal but the redundant data samples are suppressed and the stuffed sequence is allowed to pass through in their place. Thus, the line signal at the transmission rate $f_1$ comprises nonredundant data samples interleaved with the stuffed-pulse sequence.

The receiver illustrated in FIG. 3A has a phase-locked loop operating at the stuffed-pulse rate $f_3$. The necessary modification comprises correlator 19, filter 20, VCO (voltage-controlled oscillator) 21, sequence generator 22, and receiver sampler 23. Correlator 19 mixes the output of sequence generator 22 with the line signal. The output of correlator 19 indicates whether VCO 21 is running ahead or behind the interleaved stuffed-pulse sequence coming in on the line signal. The output of correlator 19 is time averaged in filter 20 and this average value drives VCO 21 at the nominal stuffed-pulse rate $f_3$. VCO 21 then drives sequence generator 22 by way of path 58 in the same manner that clock 14 drives sequence generator 15 in FIG. 2. Now the VCO 21 timing signal is used at receiver sampler 23 to sample the incoming line signal for the stuffed pulses, leaving only the nonredundant data samples which are regenerated at the rate $f_2$. Since VCO 21 runs at the nominal stuffed-pulse rate $f_3$, the nonredundant data samples are surrounded by gaps once the stuffed pulses are removed from the line signal. Thus, an elastic store within receiver sampler 23 could be used to remove the gaps and even out the data output rate to $f_2$.

The receiver rate converter of FIG. 3B whose phase-locked loop operates at the data rate $f_2$ comprises correlator 25, filter 26, VCO 27, stuffed-pulse timing clock 28, sequence generator 29, and receiver sampler 30. The phase-locked loop comprises elements 25, 26, 27, 28, and 29. Correlator 25 mixes the line signal and the output of sequence generator 29. The output of correlator 25 indicates whether VCO 27 is running ahead or behind the nonredundant data samples of the incoming line signal. The output of correlator 25 is time averaged in filter 26, and this average value drives VCO 27 at the nominal data rate $f_2$. Stuffed-pulse timing clock 28 is driven at the nominal stuffed-pulse rate $f_3$ by taking the difference between rate $f_2$ obtained from VCO 27 by way of path 59 and the transmission rate $f_1$ supplied by receiver clock 18. The timing signals from clock 28 then drive sequence generator 29. Finally receiver sampler 30, given the data timing signal from VCO 27, samples the incoming line signal at the nominal rate $f_2$ for the nonredundant data samples. Sequence generator 29 and stuffed-pulse timing clock 28 of the receiver are identical to sequence generator 15 and stuffed-pulse timing clock 14 of the transmitter.

Figure 6:
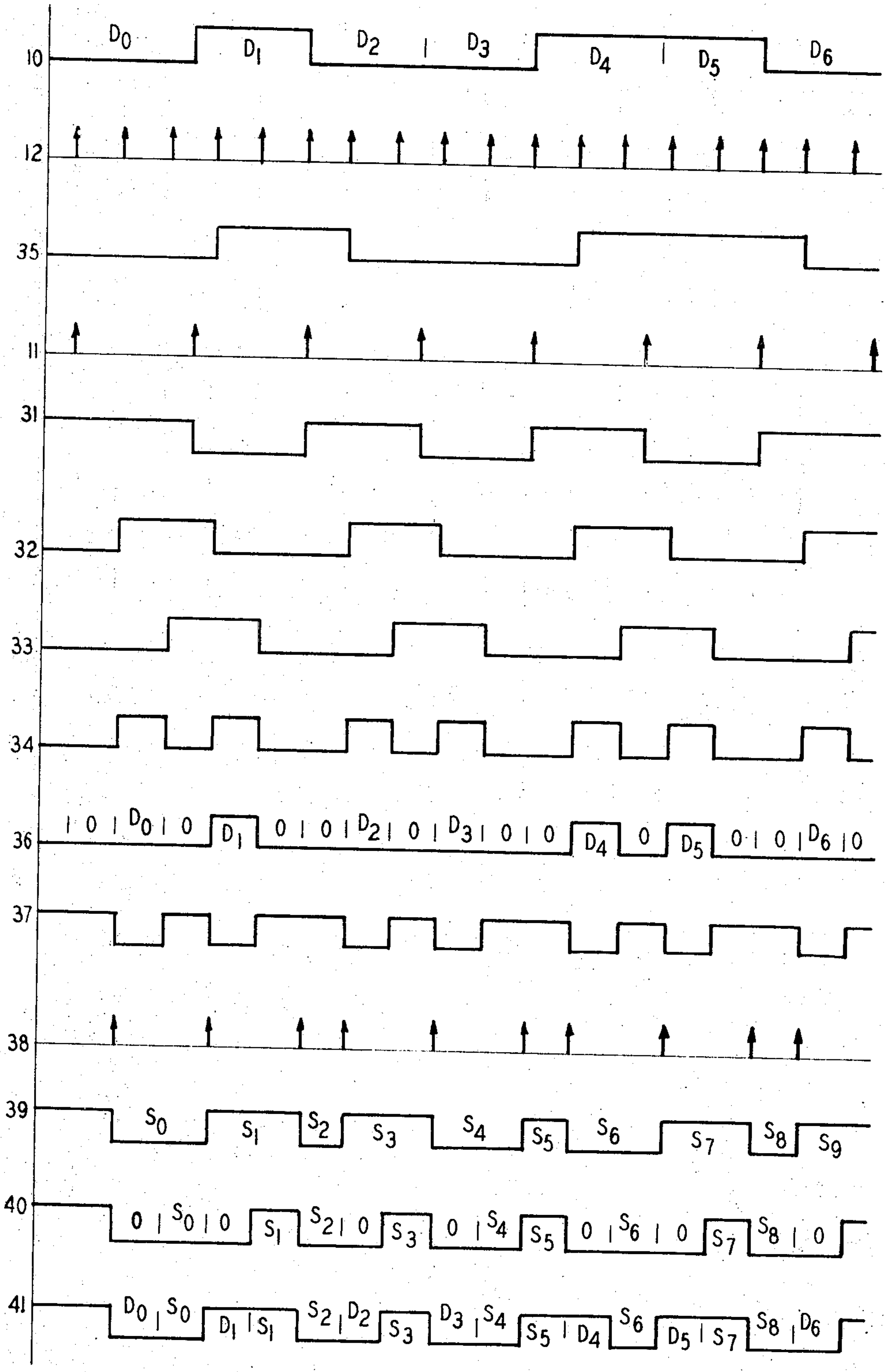
FIGS. 6 and 7 are waveform diagrams explanatory of typical operating conditions of the arrangements of FIGS. 4 and 5, respectively.
Figure 7:
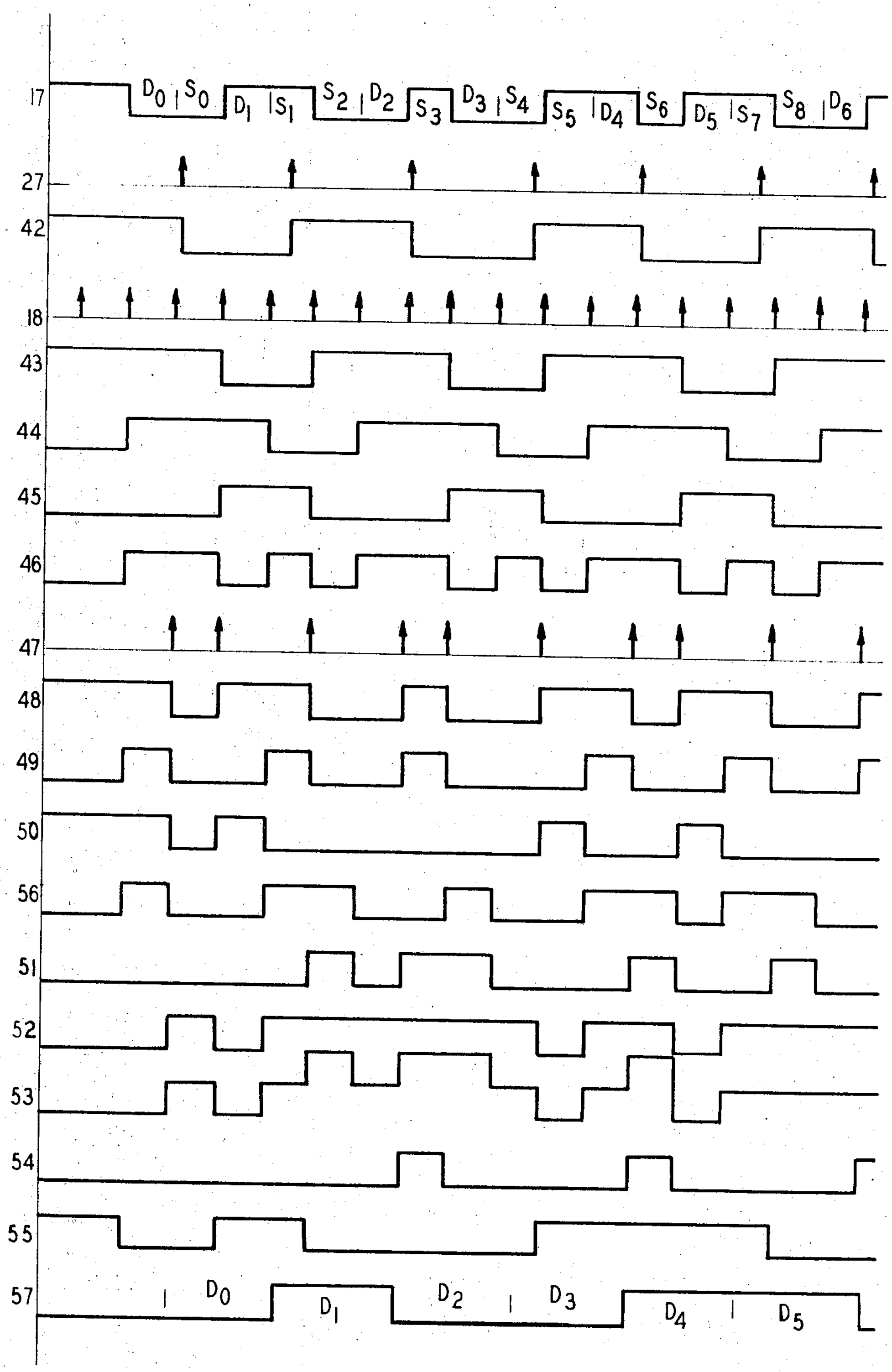

A specific illustrative embodiment of the data rate converter in which the known sequence consists of alternating zeroes and ones and in which the receiver phase-locked loop operates at the data rate $f_2$ is shown in FIGS. 4 and 5. FIG. 6 is a waveform diagram of the outputs of the transmitter elements of FIG. 4. FIG. 7 is a waveform diagram of the outputs of the receiver elements of FIG. 5.

Recall that the basic problem is to have the transmitter transmit at the rate $f_1$ only one sample of each message data pulse and to substitute in place of each redundant data sample an element of a recognizable sequence to form a line signal for delivery to transmission facility 17. At the receiver the problem is to detect the nonredundant data samples, convert them to the rate $f_2$, and deliver them to data sink 24.

The transmitter rate converter of FIG. 4 contains shift register 35 whose set input signal is the data source signal, shown on line 10 of FIG. 6, from data source 10 and whose advance timing signal is the transmission timing signal, shown on line 12 of FIG. 6, from transmitter timing clock 12. Shift register 35 functions as transmitter sampler 13 of FIG. 2. Whether the output of shift register 35, shown on line 35 of FIG. 6, is delivered to transmission facility 17 through AND gate 36 depends upon the output of EXCLUSIVE OR gate 34, shown on line 34 of FIG. 6. Only the nonredundant data samples are allowed to pass through AND gate 36 as will be explained.

The data timing signal, shown on line 11 of FIG. 6, from data timing clock 11 activates flip-flop 31. The output of flip-flop 31, shown on line 31 of FIG. 6, serves as the set input signal to shift register 32 while the transmission timing signal, shown on line 12 of FIG. 6, from transmitter timing clock 12 serves as the advance timing signal. The output of shift register 32, shown on line 32 of FIG. 6, serves as one input to EXCLUSIVE OR gate 34 and also as the set input signal to shift register 33. In addition, the transmission timing signal, shown on line 12 of FIG. 6, from transmitter clock 12 serves as the advance timing signal for shift register 33. Finally, the output of shift register 33, shown on line 33 of FIG. 6, serves as the second input to EXCLUSIVE OR gate 34.

Elements 31, 32, 33, and 34 are part of stuffed-pulse timing clock 14 illustrated in FIG. 2. These elements determine whether or not a particular data pulse has been sampled more than once at transmitter sampler 13. Thus, if the output of shift register 32, shown on line 32 of FIG. 6, and output of shift register 33, shown on line 33 of FIG. 6, are not the same at any data lining instant marked on line 11, the data sample at shift register 35 is nonredundant. As a result the output of EXCLUSIVE OR gate 34 will be ONE, AND gate 36 will be activated and the nonredundant data sample of shift register 35 will be allowed to pass on to transmission facility 17 through OR gate 41. At the same time the ONE appearing at EXCLUSIVE OR gate 34 is inverted to ZERO in inverter 37, thereby inhibiting AND gates 38 and 40. However, if the data pulse stored in shift register 35 has already been read, then the signal in flip-flop 31 will not have changed since the last transmission timing pulse. The signal stored in shift registers 32 and 33 will then be the same. Thus, the output of EXCLUSIVE OR gate 34 will be ZERO and the redundant data sample will be blocked at AND gate 36. Simultaneously, the ZERO appearing at EXCLUSIVE OR gate 34 is inverted at inverter 37 to ONE, AND gates 38 and 40 are activated, the digit stored in flip-flop 39 is allowed to pass to transmission facility 17 and become part of the line signal. Thus, the composite line signal entering transmission facility 17, line 41 of FIG. 6, consists of the nonredundant data samples interleaved with the pulses of the ZERO-ONE alternating dotting sequence. Elements 31, 32, 33, 34, 37, and 38 are equivalent to stuffed-pulse timing clock 14, flip-flop 39 is equivalent to sequence generator 15, and elements 36, 40 and 41 are equivalent to interleaver 16 of FIG. 2 as indicated by the broken-line blocks of FIG. 4.

The formation of the composite line signal is further explained assuming that $f_1=250$ Hz., $f_2=100$ Hz., and that the data source message is as shown on line 10 of FIG. 6. The stuffed-pulse rate $f_3$ thus becomes 150 Hz. The data source message, shown on line 10 of FIG. 6 can be represented by the sequence:

$$D_0(0), D_1(1), D_2(0), D_3(0), D_4(1), D_5(1), D_6(0) \ldots \quad (1)$$

where the subscript denotes the particular interval of width $1/f_2$ and the zero or one within the parentheses denotes the binary value at the respective interval. Sampling the data source message (1) at the transmission rate $f_1$ results in the following sequence (2) which contains the nonredundant data samples:

$$D_0(0), 0, D_1(1), 0, 0, D_2(0), 0, D_3(0), 0, 0, D_4(1), 0, D_5(1), 0, 0, D_6(0) \ldots \quad (2)$$

where the D's represent the nonredundant data samples and the zeros appear in the intervals where the redundant data samples occurred. This sequence, whose interval width is $1/f_2$, is shown on line 36 of FIG. 6. Some data pulses are sampled three times; that is the reason for the two redundant intervals associated with $D_1(1)$, $D_3(0)$, $D_5(1)$, et cetera.

The alternating sequence as it appears at the nominal rate $f_3$, shown on line 39 of FIG. 6, can be represented as:

$$S_0(0), S_1(1), S_2(0), S_3(1), S_4(0), S_5(1), S_6(0), S_7(1), S_8(0), S_9(1) \ldots \quad (3)$$

where the subscript denotes the particular interval of nominal width $1/f_3$ and the zero or one within the parentheses denotes the binary value of the respective stuffed-pulse. Sampling the stuffed-pulse sequence (3) at the transmission rate $f_1$ results in the following sequence of interval width $1/f_1$:

$$0, S_0(0), 0, S_1(1), S_2(0), 0, S_3(1), 0, S_4(0), S_5(1), 0, S_6(0), 0, S_7(1), S_8(0), 0 \ldots \quad (4)$$

where the zeroes are in the intervals where the corresponding nonredundant data samples occur. The sequence is shown on line 40 of FIG. 6.

Adding sequences (2) and (4) yields the composite line signal, shown on line 41 of FIG. 6:

$$D_0(0), S_0(0), D_1(1), S_1(1), S_2(0), D_2(0), S_3(1), D_3(0), S_4(0) \ldots \quad (5)$$

FIG. 5 is a specific illustrative embodiment of a receiver rate converter according to this invention wherein the phase-locked loop operates at the data rate $f_2$, and wherein the locally generated sequence is an alternating sequence of ZEROS and ONES, the same sequence chosen for the transmitter rate converter of FIG. 4. For this case the VCO 27 output is used directly to clock receiver sampler 30 of FIG. 3 for sampling the incoming line signal.

The line signal, shown on line 17 of FIG. 7, is stored in shift register 56 and at the same time serves as one input to EXCLUSIVE OR gates 50 and 55. The VCO 27 timing pulses, shown on line 27 of FIG. 7, are used to activate flip-flop 42. The output of flip-flop 42, shown on line 42 of FIG. 7, serves as the set input signal to shift register stage 43 while the transmission timing signal, shown on line 18 of FIG. 7, from receiver timing clock 18 serves as the advance timing signal. The output of shift register stage 43, shown on line 43 of FIG. 7, serves as the set input signal to shift register stage 44 while the receiver clock timing signal serves as the advance timing signal. The output of shift register 43 is inverted in inverter 45 and this inverted output serves as one input to EXCLUSIVE OR gate 46 while the output of shift register 44 serves as the other input. Elements 42, 43, 44, 45, and 46 make up part of stuffed-pulse timing clock 28 of FIG. 3B. Clock 28 operates in a manner similar to stuffed-pulse timing clock 14 of FIG. 2. AND gate 47, which is part of clock 28 and whose inputs are the receiver clock timing signal and the output of EXCLUSIVE OR gate 46, shown on line 46 of FIG. 7, generates the timing pulses used to drive flip-flop 48, the local sequence generator.

Now the locally generated sequence, line 48 of FIG. 7, is correlated with the received line signal in correlator 25 comprising elements 49, 50, 51, 52, and 53. The output of summer 53, shown on line 53 of FIG. 7, is averaged in filter 26. This averaged value then driven VCO 27 at the nominal rate $f_2$ forming the timing signal shown on line 27 of FIG. 7. The output of summer 53 contains the phase error as a direct-current component, thus filter 26 is needed to extract the phase. The nonredundant data pulses in the line signal affect the output of summer 53 as well as the output of filter 26. Over a long period the average effect of the nonredundant data pulses is zero but there is a random instantaneous effect. This is essentially noise in the phase-locked loop and this noise causes jitter. However, even if there were no nonredundant data pulses in the line signal, there would still be some jitter in the phase-locked loop due to the A-C component in the output of summer 53. However, jitter up to one-half the transmission rate period is tolerable. Also, the longer the time constant used in filter 26 the less the system is affected by single channel errors.

AND gate 54 is driven by the outputs of EXCLUSIVE OR gates 46 and 51. The output of AND gate 54, line 54 of FIG. 7, serves as the second input to EXCLUSIVE OR gate 55. Finally, the output of EXCLUSIVE OR gate 55, line 55 of FIG. 7, serves as the set input signal to shift register 57 while the timing signal from VCO 27 at the nominal rate $f_2$ serves as the advance timing signal. The purpose of gates 54 and 55 is to correct errors caused by the unavoidable jitter of VCO 27. The output of shift register 57, shown on line 57 of FIG. 7, is the original message data signal at the data rate $f_2$ and is available for delivery to data sink 24.

Recall that the composite line signal, shown on line 17 of FIG. 7, is represented by:

$$D_0(0), S_0(0), D_1(1), S_1(1), S_2(0), D_2(0), S_3(1), D_3(0), S_4(0) \ldots \quad (6)$$

where the interval width is $1/f_1$. At the receiver the object is to form a sampling wave, shown on line 27 of FIG. 7, at the correct frequency and phase to sample the composite line signal. The information to do this is obtained by comparing the line signal, particularly the stuffed-pulse components:

$$S_0(0), S_1(1), S_2(0), S_3(1), S_4(0), S_5(1) \ldots (7)$$

therein, with the locally generated sequence of alternating zeros and ones of interval width $1/f_1$, shown on line 49 of FIG. 7. This correlation yields the three state error signal, shown on line 53 of FIG. 7, which is averaged in filter 26 to control the speed of VCO 27. Sampling line 55 at the rate derived from VCO 27 yields the sequence:

$$D_0(0), D_1(1), D_2(0), D_3(0), D_4(1), D_5(1) \ldots (8)$$

which is the original data source message of interval width $1/f_2$.

While the arrangement according to this invention for matching a synchronous digital data source to a synchronous transmission facility, when the former operates at a lower rate than the latter, has been disclosed in terms of a specific illustrative embodiment, it will be apparent to one skilled in the art that many modifications are possible within the spirit and scope of the disclosed principle.

What is claimed is:

1. A data rate converter for synchronous digital data transmission systems comprising means for sampling data occurring at a rate lower than the synchronous rate of such data transmission system, means monitoring the occurrence of more than one synchronous sampling pulse within each data interval, and means responsive to said monitoring means interleaving a predetermined pulse sequence occurring at a rate equal to the difference between the synchronous and data rates with data samples at instants when multiple data samples would otherwise have occurred.

2. In combination with a synchronous digital data transmission system in which synchronous samples of lower-rate data signals are interleaved with a predetermined pulse sequence occurring at a rate equal to the difference between the synchronous and data rates with data samples at instants whenever redundant samples would have occurred, a receiver for such system comprising means locally generating said predetermined pulse sequence, means correlating a received signal including said data signals interleaved with said transmitted pulse sequence with the locally generated pulse sequence to produce a control signal, and means responsive to said control signal separating said data signals from the received signals.

3. The combination in accordance with claim 2 in which said separating means comprises an oscillator having a nominal frequency equal to the rate of said predetermined pulse sequence, sampling means driven by said oscillator for operating on said received signal to recover the transmitted predetermined pulse sequence therefrom, and means subtracting said recovered pulse sequence from said received signal to reconstruct said data signal.

4. The combination in accordance with claim 2 in which said separating means comprises an oscillator having a nominal frequency equal to the data signal rate and sampling means driven by said oscillator for operating on the received signal to recover said data signal.

5. In combination with a synchronous data transmission system having a transmitting end and a receiving end:

(a) a data signal source at said transmitting end having a data rate less than said synchronous rate;
(b) means sampling said data signal at said synchronous rate;
(c) means monitoring the occurrence of redundant samples within each data interval;
(d) means generating a first predetermined pulse sequence at a rate equal to the difference between said synchronous and data rates;
(e) means responisve to said monitoring means interleaving nonredundant data samples with said predetermined pulse sequence to form a line signal;
(f) means at said receiving end generating a second predetermined pulse sequence;
(g) means correlating said second pulse sequence with said line signal to form a control signal; and
(h) means responsive to said control signal producing a wave in correct frequency and phase for separating said data signal from said line signal.

6. The combination of claim 5 in which said wave-producing means comprises an oscillator whose nominal frequency is that of said predetermined pulse sequence and whose actual frequency varies with said control signal, and signal recovery means driven by said oscillator for operating on said received signal to separate said pulse sequence therefrom and thereby recover said data signal.

7. The combination of claim 5 in which said wave-producing means comprises an oscillator whose nominal frequency is said data signal rate and whose actual frequency varies with said control signal, and sampling means driven by said oscillator operating on the received signal to recover said data signal.

8. The combination with a synchronous digital data transmission system having the transmission rate $f_1$ and at opposite terminals of said system a respective digital data source and data sink having in common the rate $f_2$, where $f_1$ is greater than $f_2$, and means at the receiving end of said system converting data at said rate $f_2$ to a line signal at said rate $f_1$ comprising means sampling at said rate $f_1$ data from said digital data source producing nonredundant and redundant data samples, means taking the difference frequency $f_3$ between said rates $f_1$ and $f_2$, a first sequence generator responsive to said difference taking means producing a predetermined pulse sequence at said rate $f_3$, and means interleaving said nonredundant data samples with said predetermined pulse sequence to form a line signal at the rate $f_1$; and means at the receiving end of said system converting nonredundant data samples included in said line signal to the original data signal comprising a second sequence generator producing said predetermined pulse sequence, means correlating said line signal and said last-mentioned predetermined pulse sequence, an oscillator responsive to said correlator means producing a demodulating wave, means responsive to said demodulating wave separating said interleaved predetermined pulse sequence and said nonredundant data samples from said line signal, and means further responsive to said demodulating wave forcing said second sequence generator to operate at the actual rate $f_3$.

9. A data rate converter in accordance with claim 8 wherein said difference taking means comprises a flip-flop toggled at the data rate $f_2$ producing alternating binary digits.

a two-stage shift register in which said binary digits are advanced at said rate $f_1$.

means correlating binary digits stored in said two stages to indicate the occurrence of redundant data samples.

10. A data rate converter in accordance with claim 8 wherein said oscillator operates at the nominal rate $f_3$, said second sequence generator is directly controlled by said oscillator, and said separating means removes said interleaved predetermined pulse sequence from said line signal leaving said nonredundant data samples for delivery to said sink.

11. A data rate converter in accordance with claim 8 wherein said oscillator operates at the nominal rate $f_2$, further means are provided taking the difference frequency $f_3$ between said nominal rate $f_2$ and said rate $f_1$, said second sequence generator is controlled by said second difference taking means, and said separating means removes said nonredundant data samples from said line signal for delivery to said sink.

12. A data rate converter in accordance with claim 11 wherein said further difference taking means comprises a flip-flop toggled at the data rate $f_2$ producing alternating binary digits, a two-stage shift register in which said binary digits are advanced at said rate $f_1$, means correlating binary digits stored in said two stages to indicate the occurrence of redundant data samples.

No references cited.

ROBERT L. GRIFFIN, Primary Examiner

A. J. MAYER, Assistant Examiner

U.S. Cl. X.R.

179—15 Synch